(12) United States Patent
Brown

(10) Patent No.: US 7,383,861 B1
(45) Date of Patent: Jun. 10, 2008

(54) GASEOUS FUEL DEVICE

(76) Inventor: Steven Brown, Box 6204, Oklahoma City, OK (US) 73153

( * ) Notice: Subject to any disclaimer, the term of this patent is extended or adjusted under 35 U.S.C. 154(b) by 185 days.

(21) Appl. No.: 10/884,781

(22) Filed: Jul. 2, 2004

(51) Int. Cl.
*F02M 9/12* (2006.01)
*B01F 5/04* (2006.01)

(52) U.S. Cl. .................. 137/892; 137/888; 261/56; 261/118

(58) Field of Classification Search ............ 137/888, 137/892; 261/23.1, 119.2, 56, 118; 138/40.44
See application file for complete search history.

(56) References Cited

U.S. PATENT DOCUMENTS

| | | | | |
|---|---|---|---|---|
| 1,733,730 A | * | 10/1929 | Haling ............... | 261/56 |
| 3,319,944 A | * | 5/1967 | Brenneman ............ | 261/56 |
| 3,843,338 A | * | 10/1974 | Zonker et al. .......... | 48/180.1 |
| 3,898,308 A | * | 8/1975 | Baum ............... | 261/69.1 |
| 4,044,077 A | * | 8/1977 | Gupta ............... | 261/23.2 |
| 6,290,215 B1 | * | 9/2001 | Pinsker .............. | 261/23.2 |
| 6,623,154 B1 | * | 9/2003 | Garcia .............. | 137/888 |
| 6,701,960 B1 | * | 3/2004 | Stark et al. .......... | 137/888 |

OTHER PUBLICATIONS

Beam Carburetion Catalog Jan. 1984, 14 pgs Beam Products MFG Co. 3040 Rosslyn St. Los Angeles CA 90065.
Carburetion & Turbo Systems, Inc. 1999 Product Catalog, 1999, 59 pages, Carburetion & Turbo Systems, Inc. 1897 Eagle Creek Boulevard Shakopee, MN 55379-2703.

* cited by examiner

*Primary Examiner*—Gregory Huson
*Assistant Examiner*—Cloud Lee
(74) *Attorney, Agent, or Firm*—Nicole E. Coppes-Gathy

(57) ABSTRACT

A fuel conversion device comprises a restriction in a carburetion system configured to draw a gaseous fuel and air into the carburetion system. The fuel conversion device comprises an air inlet and a fuel air outlet coupled within the restriction. The fuel conversion device includes a throat and a fuel supply passage near the throat. The fuel supply passage is located between an air inlet first end and a fuel air outlet second end from about 40 to about 55 percent of a venturi length measured from the fuel air outlet second end. A ratio between a restriction diameter and the venturi length comprises at most about 1.38 to 1. The air inlet has a radius with the fuel supply passage formed as slots, or a radius with the fuel supply passage formed as bores, or a taper with the fuel supply passage formed as slots.

22 Claims, 9 Drawing Sheets

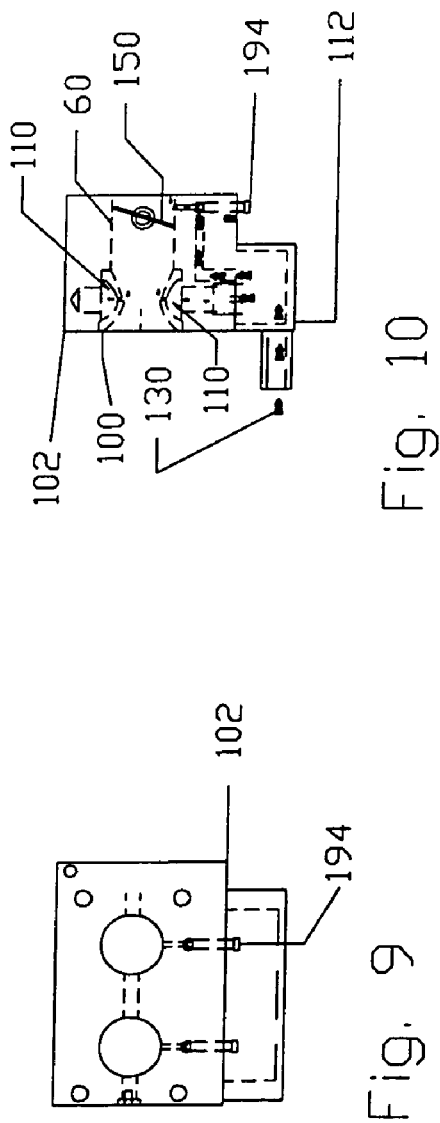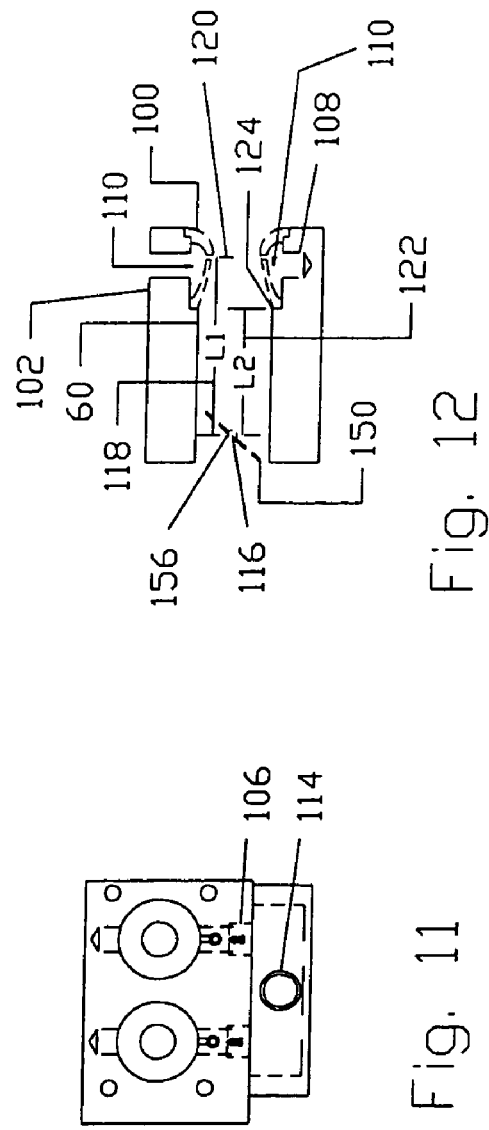

GASEOUS FUEL DEVICE

BACKGROUND

The present disclosure relates to a gaseous fuel conversion device, and particularly to a gaseous fuel venturi configured to increase power and reduce unwanted emissions of internal combustion engines.

A venturi is used to mix a gaseous fuel, with air, for combustion in an internal combustion engine. This is done, by placing a restriction in the airflow that creates increased air velocity until the restriction is reduced. As the restriction is reduced, a vacuum (i.e., a low-pressure area) is created that is used to draw fuel into the carburetor.

In gaseous fuel venturi type systems, fuel is commonly drawn into the engine by using a spud tube installed in a gasoline carburetor body, a carburetor adaptor placed between the existing carburetor and the air cleaner or by replacing the gasoline carburetor with a whole gaseous fuel carburetor. The venturi is contained within a carburetor or carburetor adapter body. Typically, the spud tube relies on the venturi profile built into the existing gasoline carburetor. Vacuum, created by the airflow through the venturi, draws on the tube to supply fuel similar to a gasoline carburetor design. Carburetors and carburetor adapters commonly use a removable or changeable venturi so that the same body can accommodate different engines, matching venturi size with engine size and fuel type. Airflow and vacuum are used in a similar manner as with a spud tube, but fuel is typically drawn into the system through slots or holes. Venturis in carburetors and carburetor adaptors can be specifically designed for gaseous fuel.

Conventional removable-changeable venturis are typically shaped like an hourglass, as illustrated in prior art FIG. 1. The fuel is supplied to the venturi, through the orifice or load block, by the fuel regulator. As suction from the venturi reaches the fuel regulator, a diaphragm moves. As the diaphragm moves, it actuates a valve that allows fuel to flow to the venturi, through the orifice or load block. Since the pressure from the fuel in the regulator is offset by the suction of the venturi, there is very little vacuum or zero pressure in the hose between the regulator and the carburetor or adapter. Regulators are often fitted with a primer button. This is used to force fuel into the carburetion system to aid in starting. Regulators may also be fitted with an idle circuit that can also be used to aid in cold starts since they force fuel into the carburetion system as well. When used to aid in starting, the primer button is depressed, pushing on the regulator's diaphragm. The diaphragm connects to the regulator's fuel valve, so as the diaphragm moves, fuel is released and delivered to the venturi.

Common venturi systems include a spud, an adaptor, and a carburetor. A spud tube replaces the existing main jet in a gasoline carburetor. Because the "built-in" venturi is designed to work with gasoline, it does not mix air and gaseous fuels properly throughout the entire engine's operating range. The average gasoline carburetor's venturi is designed to create a little turbulence that "helps" gasoline to atomize. Such turbulence in the airflow is counterproductive in gaseous fuel carburetion systems since the gas is a vapor already. Such disruptions in the airflow cause the spud tube to be a very inefficient system for mixing air and fuel. The inconsistent fuel delivery of the spud tube causes loss of power and varying emission levels throughout the operating curve. Hard startirig and power losses over about 50% are common with spuds when compared with the same engine operating on gasoline. Spuds have been popular because of low cost, but are time consuming to install.

Adapters place a venturi, contained in the adapter body, between the carburetor and the air cleaner. The gasoline carburetor's throttle is still used. While adapters are vastly superior to the spud tube, the venturi shape and sizing can radically alter the performance of the engine and fuel delivery. The main disadvantage, with an adapter, is its usual proximity to the gasoline carburetor's venturi. This second venturi can cause some airflow disruptions resulting in some loss of power.

Among venturi type systems, carburetors offer the best performance since there is no restriction from another venturi and the venturi/carburetor body can be specifically designed for the fuel and engine application. However, the distance between the venturi and throttle location is critical. If the venturi is too close to the throttle, the air/fuel mix does not have time to blend properly before hitting the throttle valve (i.e., butterfly). With replacement carburetors, the distance between venturi and throttle is limited because the gasoline carburetor being replaced usually determines gaseous fuel carburetor length. Yet, it is quite common, on many carburetor designs, for the venturi to be placed further in the throat closer to the throttle since most manufacturers design a standard "carburetor body" that is fitted to each application. This throttle/venturi body is commonly fitted between flange adapters for the inlet and outlet of the carburetor.

Multi cylinder engines present special problems regarding emissions. Engines, with two or more cylinders and a single barrel carburetor, have difficulty in balancing the emissions between cylinders. As emission requirements tighten, it is important that each cylinder have similar emissions numbers. If emissions are not balanced, then one or more cylinders must run too lean to compensate for others that are too rich, so that the lowest overall emissions levels can be achieved. The difference in emission levels between cylinders is the result of a common intake manifold, cam profile, and valve timing. As one cylinder takes in fuel, the other cylinder may still be drawing fuel into its combustion chamber at the same time. This is caused by valve overlap and cam profile. Much of this excess fuel does not completely combust and contributes to higher emissions.

The common solution, to emissions variance between cylinders, is to have an individual barrel/venturi/manifold inlet for each cylinder (e.g., a two-cylinder engine would have a two-barrel carburetor). On a gasoline carburetor, both barrels share a common fuel bowl. This does not contribute to problem of emissions variance since each cylinder's main jet meters out the fuel and the gasoline is only drawn into the cylinder when venturi suction occurs. Common to most new multi-barrel carburetor designs, both throttle lever butterfly valves share a common adjustment, but each barrel can have its own idle circuit mixture. However, when operating on gaseous fuel a common fuel inlet into the carburetor or adapter, for a multi cylinder carburetion system (e.g., a two-barrel carburetor) is just about the same as having a single barrel carburetor since both cylinders draw from a single source. The fuel regulator can also contribute to variances in cylinder emissions. Most modern two cylinder engines, for example, have an "intake, intake, exhaust, exhaust" not "intake, exhaust, intake, exhaust" stroke pattern. While the first cylinder takes in fuel, the gaseous fuel regulator's diaphragm/fuel valve has not yet retracted before the second cylinder takes in fuel. The fuel valve remains partially open. The result is an extra rich intake stroke for the second cylinder. Even at idle this is a concern since the regulator's internal idle circuit delivers pressurized fuel at low speeds with the same result. Existing gaseous fuel carburetor designs (venturi and non-venturi types), both single barrel and multi-barrel, may have an idle circuit by-pass that supplies fuel between the fuel inlet port and the load-block or metering valve. In such designs, all cylinders share the same air fuel mixture for idle, so the single adjustment does not address idle circuit related emissions variance. Also common to existing multi-cylinder carburetion designs is a common fuel inlet port to the carburetor, or carburetor adapter, that supplies fuel to all cylinders. Because of these challenges, each cylinder needs its own metered fuel mixture.

There are several challenges not addressed by current venturi style conversion systems. These challenges include current spud tube, adapter, carburetor and venturi designs, which rob too much power from the engine because of inefficient airflow designs. These inefficiencies also produce inconsistencies in fuel delivery that prevent a catalytic muffler (if present) from performing properly. Current carburetion designs may pass current certification requirements (i.e., high speed, full throttle) but may not pass future certification requirements that consider varying loads and speeds. This will be especially true when the emission levels require a catalytic muffler to meet the standards. Current carburetor and adapter designs still use a common inlet for multi-barrel carburetors and adapters. This prevents each cylinder from receiving a precise amount of fuel needed to minimize emission levels.

What is needed in the art is a gaseous fuel venturi configured to increase power and reduce unwanted emissions of internal combustion engines.

SUMMARY

A fuel conversion device is disclosed. The fuel conversion device comprises a restriction in a carburetion system configured to draw a gaseous fuel into the carburetion system, to mix the gaseous fuel with air and to discharge a fuel air mixture for combustion. The restriction includes a restriction diameter. The fuel conversion device also comprises an air inlet coupled within the restriction. The air inlet is configured to reduce a flow area from an air inlet first end to an air inlet second end. The fuel conversion device also comprises a fuel air outlet coupled within the restriction. The fuel air outlet is configured to increase the flow area from a fuel air outlet first end to a fuel air outlet second end. The fuel air outlet first end is proximate the air inlet second end. The fuel conversion device also comprises a throat coupled within the restriction between the air inlet second end and the fuel air outlet first end. The fuel conversion device also comprises a fuel supply passage in fluid communication within the restriction and proximate the throat. The fuel supply passage is located between the air inlet first end and the fuel air outlet second end from about 40 percent to about 55 percent of the length measured from the fuel air outlet second end. The fuel conversion device also comprises a length comprising a distance from the air inlet first end to the fuel air outlet second end. The fuel conversion device also comprises a ratio between the restriction diameter and the length comprising at most about 1.38 to 1. The air inlet and the fuel supply passage are configured as one of the air inlet having a radius with the fuel supply passage formed as slots, a radius with the fuel supply passage formed as bores, and a taper with the fuel supply passage formed as slots.

The present invention also includes an embodiment in which the restriction is configured for the gaseous fuel to flow through the fuel supply passage into the fuel air outlet proximate the throat and mix with the air flowing through the fuel air outlet from the throat. The present invention also includes an embodiment in which the fuel supply passage comprises one of at least one slot and at least one bore. The present invention also includes an embodiment in which the fuel air outlet includes a variable fuel air outlet diameter configured to match a throttle bore adjacent the fuel air outlet second end and a variable distance between the fuel air outlet second end and the fuel air outlet first end. The present invention also includes an embodiment in which one of a straight cut, a radius and a taper in the throat. The present invention also includes an embodiment in which the air inlet includes one of a radius and a taper from the air inlet first end to the air inlet second end. The present invention also includes an embodiment in which the fuel air outlet includes a straight cut, a tapered profile, and a radius profile along a fuel air outlet inner wall from the fuel air outlet first end to the fuel air outlet second end. The present invention also includes a fuel space upstream and proximate the fuel supply passage and downstream from the gaseous fuel source. The fuel space is configured to contain a volume of the gaseous fuel for supply to the fuel supply passage. The present invention also includes a fuel air outlet first end diameter one of a diameter larger than air inlet second end and a diameter of equal diameter to air inlet second end in the fuel air outlet proximate the throat.

The present invention provides a fuel conversion device comprising a venturi body extending from a venturi first end to a venturi second end. The venturi body includes a venturi length comprising a distance from the venturi first end to the venturi second end and a restriction diameter extending radially to a venturi outer wall. The fuel conversion device also includes an air inlet portion formed in the venturi body having an air inlet first end and an air inlet second end opposite the air inlet first end. The fuel conversion device also includes a fuel air outlet portion formed in the venturi body having a fuel air outlet first end and a fuel air outlet second end opposite the fuel air outlet first end. The fuel air outlet first end is located proximate the air inlet second end. The fuel conversion device also includes a throat formed in the venturi body between the air inlet second end and the fuel air outlet first end. The fuel conversion device also includes a fuel supply passage disposed through the venturi body proximate the throat. The fuel supply passage couples with the fuel air outlet proximate the throat at a location from about 40 percent to about 55 percent of the venturi length measured from the venturi second end. The fuel conversion device also includes a ratio between the restriction diameter and the venturi length comprising at most about 1.38 to 1. The air inlet and the fuel supply passage are configured in one of a configuration of the air inlet having a radius with the fuel supply passage comprising a slot, a radius with the fuel supply passage comprising a bore and a taper with the fuel supply passage comprising a slot.

The present invention also includes an embodiment in which the fuel supply passage is configured to fluidly couple a gaseous fuel source with the fuel air outlet portion proximate the throat. The present invention also includes an embodiment in which the fuel supply passage comprises one of at least one slot and at least one bore. The present invention also includes an embodiment in which the air inlet portion includes one of a radius and a taper formed between the air inlet first end and the air inlet second end. The present invention also includes an embodiment in which the fuel air outlet portion includes one of a back cut, a radius and a taper along the fuel air outlet inner wall. The fuel conversion device also includes a fuel space formed proximate the fuel supply passage at the venturi outer wall. The venturi outer wall includes an outer wall radius proximate the fuel supply passage and a fuel inlet. The fuel space is configured to contain a volume of a gaseous fuel for supply to the fuel supply passage. The fuel conversion device also includes where the venturi body includes a carburetor throttle bore matching feature. The carburetor throttle bore matching feature includes a configuration of the fuel air outlet portion along the fuel air outlet inner wall variable by the location of the throat relative to the fuel air outlet second end and an inner diameter of the fuel air outlet inner wall. The inner diameter proximate the venturi second end matches the carburetor throttle bore. The present invention also includes an embodiment in which the fuel air outlet first end comprises a diameter larger than a diameter of the air inlet second end.

The present invention also provides a method of using a fuel conversion device. The method comprises drawing air into a carburetion system air inlet and reducing a flow area of the air flowing through the air inlet from an air inlet first end to an air inlet second end. The method also comprises increasing the flow area from a fuel air outlet first end to a fuel air outlet second end. The fuel air outlet first end is proximate a throat between the air inlet and the fuel air outlet. The method also comprises drawing a gaseous fuel into the fuel air outlet through a fuel supply passage proximate the throat at a location between the air inlet first end and the fuel air outlet second end at a dimension of from about 40 percent to about 55 percent of a venturi length measured from the fuel air outlet second end. The venturi length comprises a distance from the air inlet first end to the fuel air outlet second end. The method also comprises mixing the gaseous fuel with the air proximate the throat and through the fuel air outlet and forming a fuel air mixture. The method also comprises discharging the fuel air mixture from the fuel air outlet second end for combustion. The method also comprises forming a ratio between a restriction diameter and the venturi length. The restriction diameter comprises an outer diameter of the air inlet first end. The ratio comprises at most about 1.38 to 1. The method also comprises where the air inlet and the fuel supply passage comprises one of a radius along the air inlet with the fuel supply passage forming a slot, a radius along the air inlet with the fuel supply passage forming a bore, and a taper along the air inlet with the fuel supply passage forming a slot.

The method also comprises drawing the gaseous fuel from a gaseous fuel supply coupled to the carburetion system. The method also comprises drawing the gaseous fuel into the throat through the fuel supply passage. The fuel supply passage comprises one of at least one slot and at least one bore proximate the throat. The method also comprises containing a volume of the gaseous fuel for supply to the fuel supply passage in a fuel space upstream and proximate the fuel supply passage and downstream from a gaseous fuel source. The method also comprises matching an inner diameter of the fuel air outlet proximate the fuel air outlet second end with a carburetor throttle bore. The matching including varying a location of the throat relative to the fuel air outlet second end and varying the inner diameter of the fuel air outlet. The inner diameter proximate the fuel air outlet second end matches the carburetor throttle bore.

BRIEF DESCRIPTION OF THE FIGURES

Referring now to the figures, wherein like elements are numbered alike:

FIG. 9 is an illustration of an exemplary carburetion system;
FIG. 10 is an illustration of an exemplary carburetion system;
FIG. 11 is an illustration of an exemplary carburetion system;
FIG. 12 is a cross-sectional illustration of an exemplary carburetion system.

DETAILED DESCRIPTION

Figure 1:
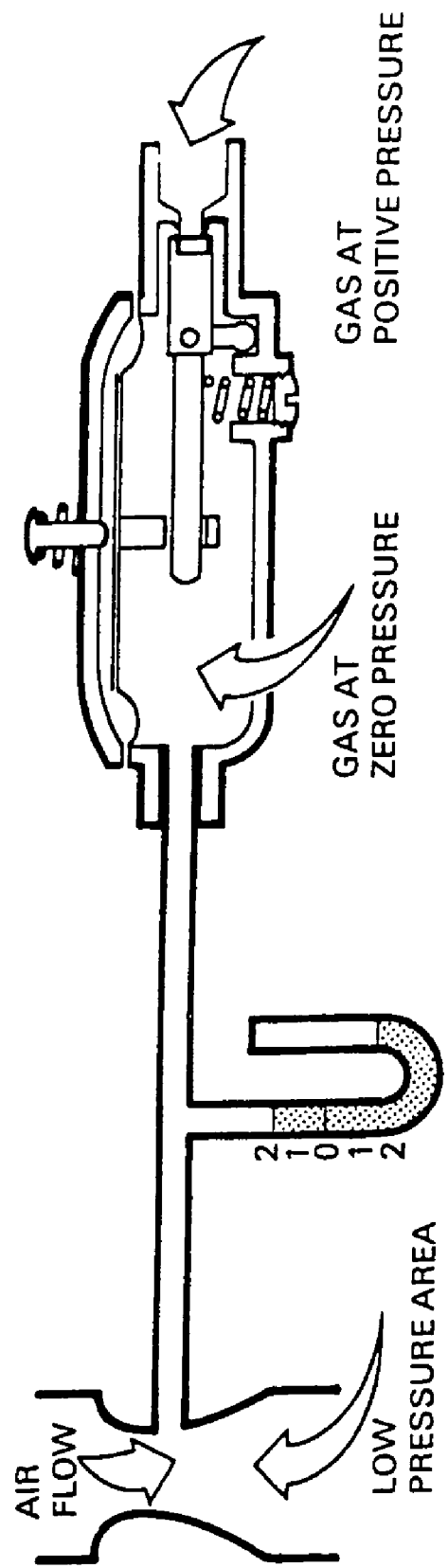
FIG. 1 is an illustration of a prior art carburetion system for gaseous fuel.

A venturi is a restriction in the engine's air intake that causes an increase in engine intake air velocity. As the air velocity increases (i.e., restriction decreases), the flowing air creates a low-pressure area (i.e., vacuum) where a gaseous fuel may be introduced. The smaller the restriction for a given volume of air (i.e., venturi size) the more fuel is drawn into the engine. By changing the venturi size (for carburetor adapters and carburetors only) starting and horsepower can be enhanced as well as the consistency of fuel delivery levels at given RPM ranges.

The present invention addresses the power, emissions and application needs for venturi-type gaseous fuel carburetion. The present invention venturi designs, when used in adapters, have boosted power by about 5% to about 20% over conventional venturi styles. Carburetor/venturi combinations have produced even more power. In laboratory certification tests, these carburetion designs have exceeded comparable spud certified engines by delivering over about 40% more power and lower emissions. All of these benefits are attributed to improvements in airflow and fuel intake. The present invention produces cleaner emissions and better performance at varying speeds and loads compared with conventional fuel systems used on the same engine models. The present invention delivers fuel consistently throughout the engine's operating power curve. Consistent fuel delivery is not only important for power, but for proper management of emissions, especially when using a catalytic muffler. Central to the present invention is the venturi. While some features of the inventive venturi are shared with other venturis, the unique smoothness and shape of the inventive venturi produces novel improvements.

The following broadly describes four exemplary embodiments; a venturi with centered fuel inlet slots, with or without back cut for fuel slots, curved outside profile, with curved air inlet surface and specified diameter/length ratio; a venturi with centered fuel holes, with or without back cut for fuel holes, curved outside profile, with curved air inlet surface (diameter/length ratio not critical provided that air inlet curve is present); a venturi with centered fuel slots, with or without back cut for fuel slots, curved outside profile, with straight air inlet; and a venturi with variable centered slot location, within specified diameter/length ratio, adjusting fuel outlet wall angle and outlet diameter for carburetor throttle bore matching.

In an exemplary embodiment, the venturi can be defined as the complete restriction in a carburetion system designed to draw fuel into the carburetion system to mix the fuel with air for the purpose of combustion. In other embodiments, the venturi can include a variety of designs that allow for removal and insertion of portions of the venturi into existing carburetors or carburetor conversion adapters. Although most removable venturis contain the complete restriction, it is possible to include part or all of a non-removable venturi into the design of a carburetor, or carburetor adapter. In exemplary embodiments, a "shorter" removable venturi portion may be added to a fixed venturi portion to complete the venturi function. The venturi can be made up of a complete venturi form, in a fixed non-removable assembly that contains an outer wall formed into the carburetor body, a completely removable assembly and assemblies with part or portions that are removable.

Figure 2:
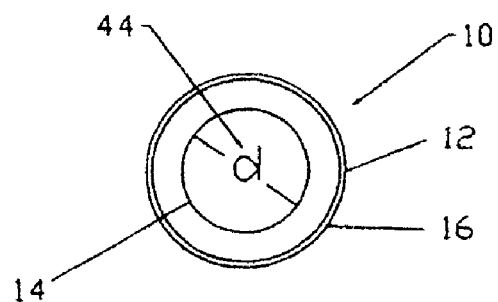
FIG. 2 is a top view of an exemplary embodiment of a venturi section.
Figure 3:
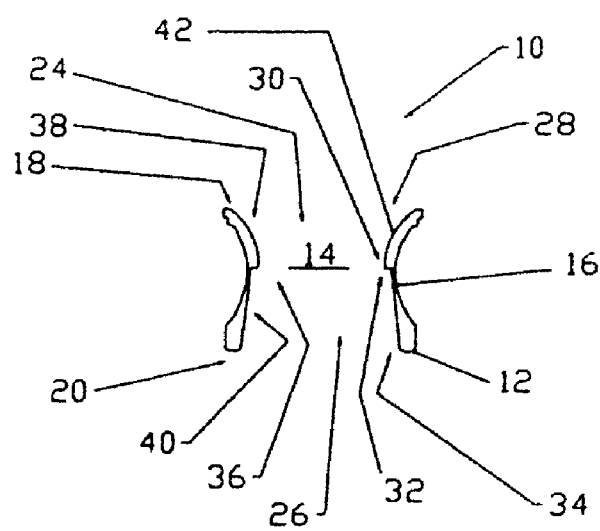
FIG. 3 is a cross-sectional view of an exemplary embodiment of a venturi section.
Figure 4:
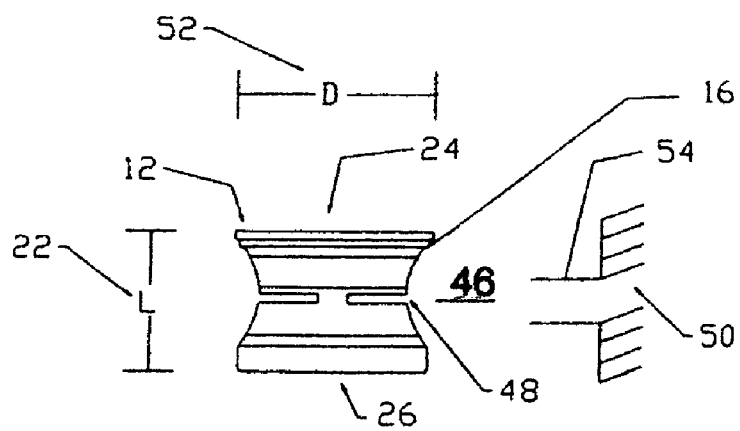
FIG. 4 is a side view of an exemplary embodiment of a venturi section.
Figure 5:
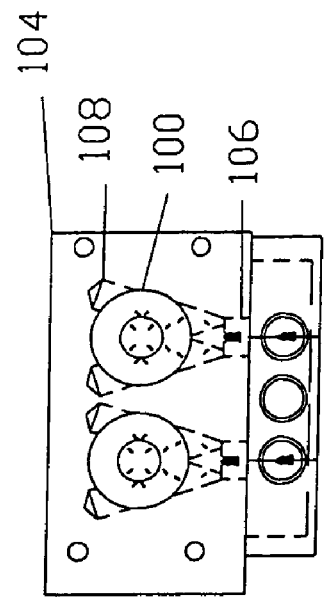
FIG. 5 is an illustration of an exemplary carburetion system.
Figure 6:
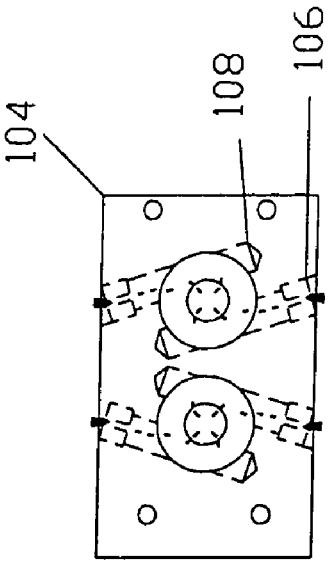
FIG. 6 is an illustration of an exemplary carburetion system.
Figure 7:
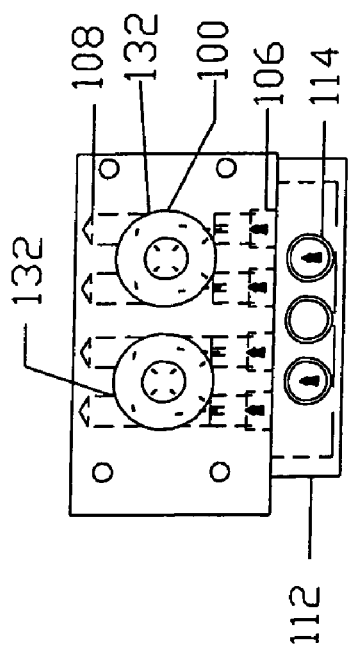
FIG. 7 is an illustration of an exemplary carburetion system.
Figure 8:
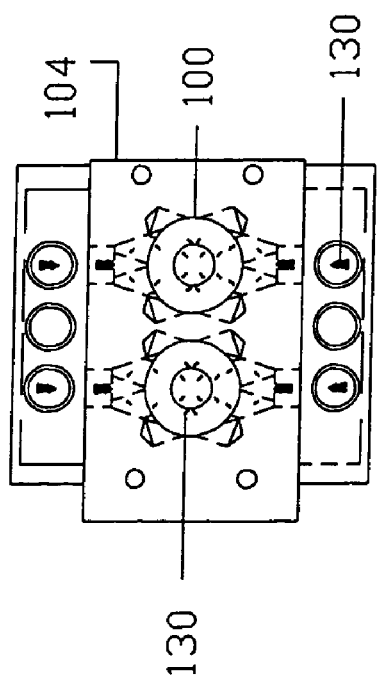
FIG. 8 is an illustration of an exemplary carburetion system.

Referring to FIGS. 2-4, an exemplary venturi section is illustrated in a top view, cross-sectional side view and a side view, respectively. The venturi 10 includes a venturi body 12, a throat 14 of a specified size diameter d, and of variable length, and venturi outer wall 16. The venturi outer wall 16 extends from a venturi first end 18 to a venturi second end 20. A venturi length 22 can be defined by a dimension L. The dimension, L is measured from the venturi first end 18 to the venturi second end, 20 near the carburetor throttle bore 60 (see FIGS. 10 and 12).

The venturi body 12 can comprise an air inlet portion 24 and a fuel air outlet portion 26 with the throat 14 formed between the air inlet portion 24 and the fuel air outlet portion 26. The air inlet portion 24 includes an air inlet first end 28 and an air inlet second end 30. The fuel air outlet portion 26 includes a fuel air outlet first end 32 and a fuel air outlet second end 34. The air inlet second end 30 is near the fuel air outlet first end 32. Throat 14 begins at the air inlet second end 30 and ends at the fuel air outlet first end 32. A venturi inner wall 36 comprises an air inlet inner wall 38, the throat 14 and a fuel air outlet inner wall 40. The venturi inner wall 36 extends substantially from the venturi first end 18 to the venturi second end 20. The air inlet inner wall 38 extends substantially from the air inlet first end 28 to the air inlet second end 30. The fuel air outlet inner wall extends substantially from the fuel air outlet first end 32 to the fuel air outlet second end 34.

The air inlet portion 24 is configured to reduce the area of air flow to throat 14 from the air inlet first end 28 to the air inlet second end 30. As a result, air entering the air inlet first end 28 is accelerated through throat 14 as a result of decreasing flow area. In an exemplary embodiment, the air inlet portion 24 includes a convex radius or taper 42 in the axial direction (airflow path) between the air inlet first end 28 (larger inside diameter) to the air inlet second end 30 (smaller inside diameter). Air entering venturi 10 can be gradually forced into a smaller flow area after entering the air inlet portion 24 as a result of the shape of the radius or taper 42. The air inlet portion 24 can be integral with the throat 14 and fuel air outlet portion 26. The air inlet portion 24 can be disconnected and separable from the throat 14 and the fuel air outlet portion 26.

The throat 14 is located adjacent the air inlet portion 24 proximate the air inlet second end 30 and located adjacent the fuel air outlet portion 26 proximate the fuel air outlet first end 32. The throat 14 includes a throat diameter 44 that is defined by a dimension d at the narrowest diameter of the throat 14. The throat 14 is configured to accelerate the air flowing through the venturi body 12, such that the accelerated airflow creates low air pressure in the venturi body 12 near the throat 14. The low-pressure air can be used to draw fuel into the fuel air outlet portion 26 from an exterior 46 of the venturi outer wall 16 as a result of a pressure difference between the air pressure at the throat 14 and the exterior 46. Fuel is introduced into the fuel air outlet portion 26 at a point just beyond fuel air outlet first end 32, near throat 14.

A fuel supply passage 48 is formed in the venturi body 12 through the venturi body 12 at a location proximate the throat 14. The fuel supply passage 48 can be configured as a slot(s) or as a hole(s) (bores) in the venturi body 12. The fuel supply passage 48 extends from the fuel air outlet inner wall 40 to the exterior 46 of the venturi outer wall 16. The fuel supply passage 48 is configured to fluidly couple a fuel source 50 with the fuel air outlet inner wall 40 of the venturi 10. Fluidly coupling can be defined as allowing a fluid material to connect (couple) in a given volume, to facilitate mass flow of the fluid, heat transfer through the fluid and transfer pressure forces through the fluid. The fuel source can be a fuel outlet 54 discharging near the exterior 46 and being supplied from a remote fuel source (not shown). In a preferred embodiment, the fuel source 50 can comprise a gaseous fuel, such as natural gas, propane, methane, hydrogen and the like, being supplied through a fuel demand type regulator to a carburetor or carburetor adapter. A carburetor typically contains one or more throttle valve plate(s) (i.e., butterfly) with a device for adjusting throttle valve plate(s) and that mounts on the engine block or on the intake manifold. A carburetor adaptor contains one or more venturis and mounts between the air source and an existing carburetor body, and utilizes the throttle valve plate of the existing carburetor.

A relationship between a restriction diameter 52, shown as dimension D, and the venturi length 22 can be defined as a restriction diameter to venturi length ratio (diameter to length ratio). The diameter to length ratio describes the relationship between two of the venturi 10 dimensions that can influence the performance of the venturi 10. In a preferred embodiment, the ratio between the restriction diameter 52 and the venturi length 22 is below about 1.38 to 1 (1.38:1) and locates the fuel supply passage 48 center line between 40% and 55% of the venturi length 22, dimension L, when measured from the fuel air outlet second end 34. The exterior 46 space is formed by a concave radius. The fuel supply passage 48 center line location, in conjunction with the diameter to length ratio, is employed to maximize power and lower emissions in an internal combustion engine (not shown) coupled to the venturi 10 through a carburetor or carburetor adapter. The air inlet and fuel supply passage are configured as one of the following; the air inlet having a radius with the fuel supply passage formed as slots, the air inlet having a radius with the fuel supply passage formed as bores, and the air inlet having a taper with the fuel supply passage formed as slots.

Referring now to FIGS. 5-11, in an embodiment of the carburetion system, the venturi 100 is contained within one of a carburetor 102 and a carburetor adapter 104 for the conveyance of fuel 130 from a fuel regulator (not pictured) to the venturi 100.

In an embodiment of the carburetion system, more than one venturi 100 is present in the carburetor 102 and the carburetor adapter 104. Fuel 130 is supplied to the carburetor 102 and the carburetor adapter 104 through a fuel regulator, upstream from carburetor 102 and carburetor adapter 104, and having a single demand type diaphragm and fuel valve (not shown). The carburetor 102 and the carburetor adapter 104 comprise at least one fuel supply port 106 for each venturi 100.

In another embodiment illustrated in FIGS. 5-11, the carburetor 102 and the carburetor adapter 104 comprises fuel port(s) 106 with extended passage(s) 108. The fuel port(s) 106 connects and supply fuel 130 to the venturi exterior 110. The length extends beyond the venturi 100. The extended passage 108 comprises a length that extends beyond the intersection 132 wherein extended passage 108 connects to venturi exterior 110.

As illustrated in FIGS. 5-11, in an embodiment, the carburetor 102 and the carburetor adapter 104 comprise fuel bowl 112. Fuel 130 is supplied to the carburetor 102 and carburetor adapter 104 fuel supply port(s) 106. Fuel bowl 112 has one of a single fuel inlet port 114 and multiple fuel inlet port 114 to the fuel bowl 112.

The gaseous fuel bowl 112 can be installed in the venturi 100 to address the problem of uneven fuel delivery caused by a fuel regulator. Additionally, the use of the gaseous fuel bowl 112 reduces the need for external fuel supply hoses and fittings. Only a single hose (not shown) is needed from the fuel regulator to the carburetor 102 or the carburetor adapter 104. The gaseous fuel bowl 112 provides a place for the fuel to expand and contract before being drawn into the fuel supply port 106 of the carburetor 102 or the carburetor adapter 104.

The gaseous fuel bowl 112 is unlike a conventional gasoline fuel bowl since its function is equalization, not merely storage. Gasoline, in a gasoline carburetor bowl, is held in check by gravity and must be vented to atmosphere. In contrast, the gaseous fuel bowl 112 must be a non-vented container and the fuel is allowed to expand and contract as each cylinder draws fuel from within the gaseous fuel bowl 112. The result of using a gaseous fuel bowl 112 is a more even distribution of fuel supplied to each cylinder compensating for the fuel regulator delivery inconsistencies.

A gaseous fuel bowl 112 offers several other advantages. The gaseous fuel bowl 112 has no need for a tee to distribute fuel individually to each cylinder's fuel inlet port. When using a gaseous fuel bowl 112, fuel supply port 106 can draw freely and equally from the gaseous fuel bowl 112. In another embodiment, each fuel supply port 106 can draw freely and equally from the gaseous fuel bowl 112 using one of orifice(s) that can be installed in each cylinder's fuel supply port 106 within the gaseous fuel bowl 112 for very precise metering, and orifice(s) connected to fuel bowl 112 fuel inlet port(s) 114 for very precise metering.

As illustrated in FIG. 12, the distance 118, shown as dimension L1, specifies a length between the carburetor throttle shaft centerline 116 of the carburetor 102, and the venturi fuel supply passage 120. The distance 122, shown as dimension L2, specifies a length between the carburetor throttle shaft centerline 116 of the carburetor 102 and the venturi fuel air outlet second end 124 near the throttle bore 60. The throttle shaft to venturi ratio is defined as a relationship between distance 118 when divided by the distance 122. The throttle shaft to venturi ratio describes the relationship between two of the carburetor 102 dimensions that can influence the performance of the carburetor system. In a preferred embodiment, the ratio between distance 118 and distance 122 is below about 1.6 to 1 (1.6:1). This ratio reflects an optimal spacing between carburetor throttle shaft centerline 116, and venturi 100, resulting in improvements in fuel delivery and airflow patterns within carburetor 102.

Figure 13:
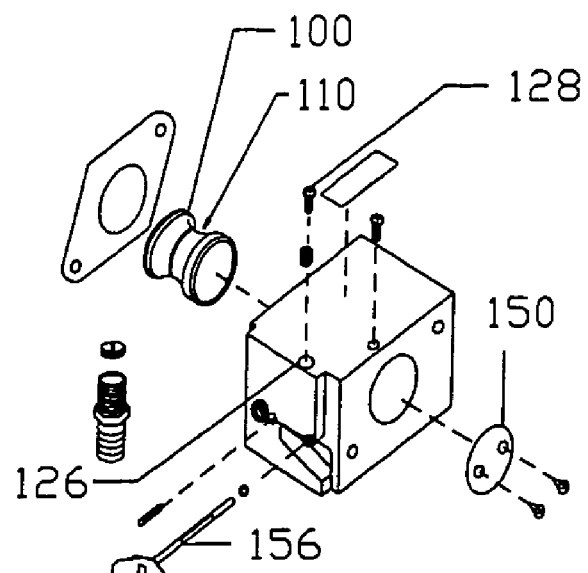
FIG. 13 is an exploded view illustration of an exemplary carburetion system.
Figure 14:
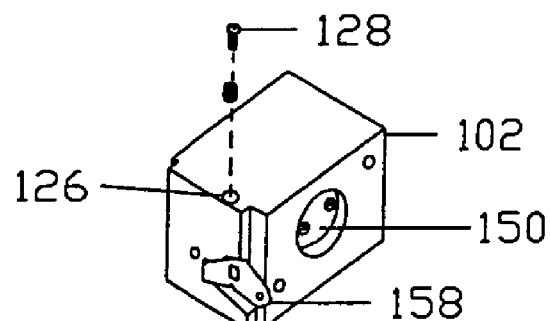
FIG. 14 is a perspective view illustration of an exemplary carburetion system.
Figure 15:
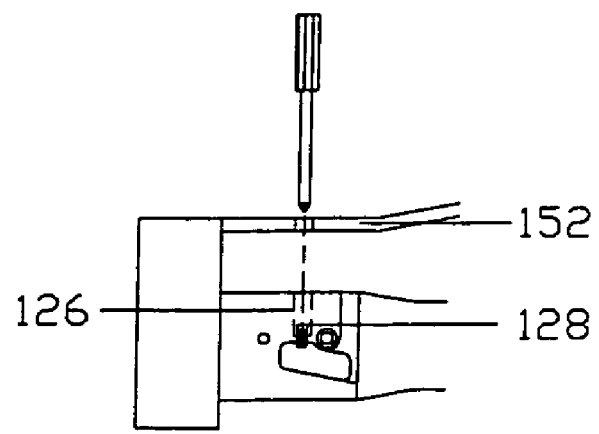
FIG. 15 is an illustration of an exemplary carburetion system.
Figure 16:
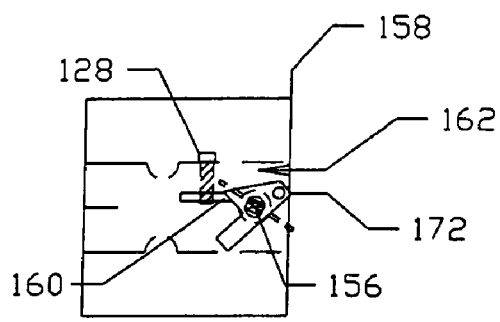
FIG. 16 is an illustration of an exemplary throttle lever configuration.
Figure 17:
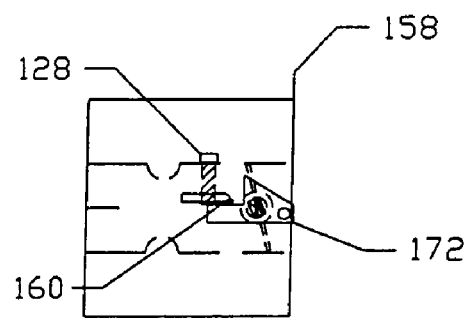
FIG. 17 is an illustration of an exemplary throttle lever configuration.
Figure 18:
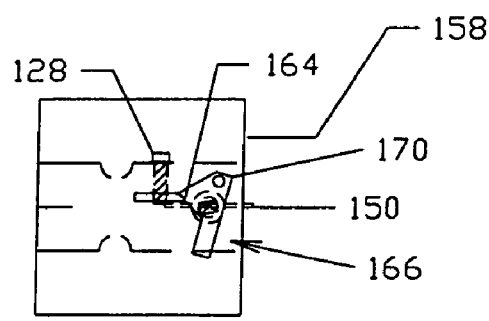
FIG. 18 is an illustration of an exemplary throttle lever configuration.
Figure 19:
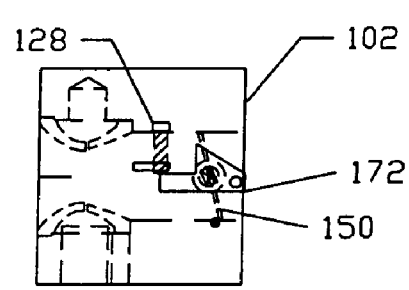
FIG. 19 is an illustration of an exemplary carburetion system.
Figure 20:
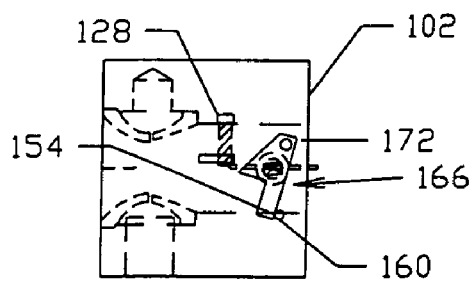
FIG. 20 is an illustration of an exemplary carburetion system.
Figure 21:
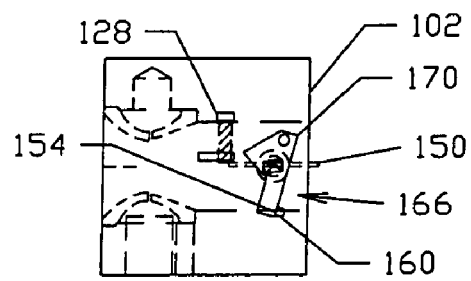
FIG. 21 is an illustration of an exemplary carburetion system.
Figure 23:
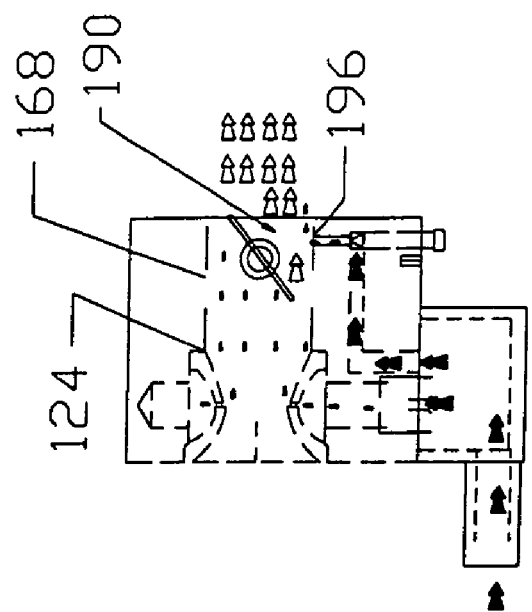
FIG. 23 is an illustration of an exemplary carburetion system.
Figure 22:
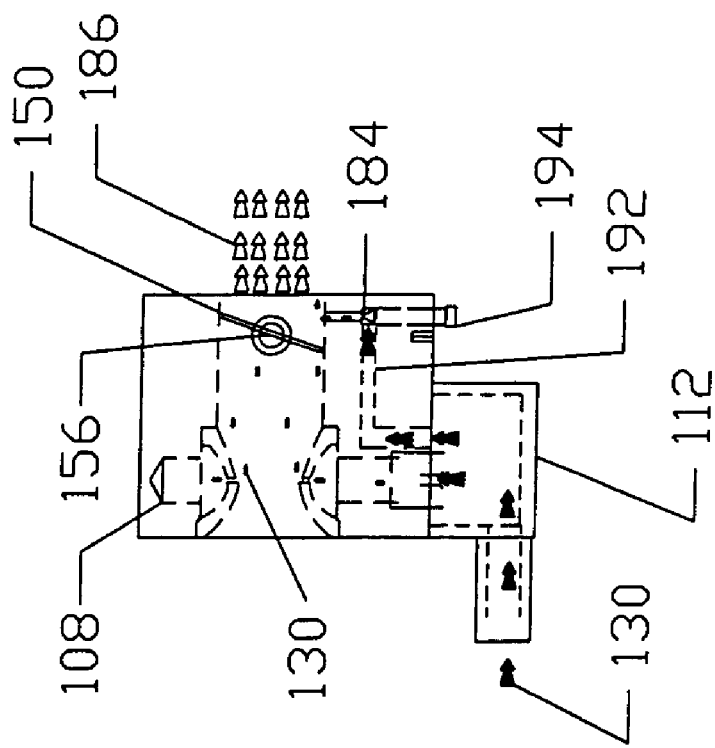
FIG. 22 is an illustration of an exemplary carburetion system.
Figure 26:
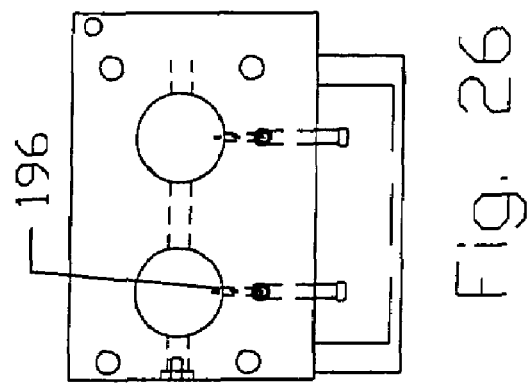
FIG. 26 is an illustration of an exemplary carburetion system.
Figure 25:
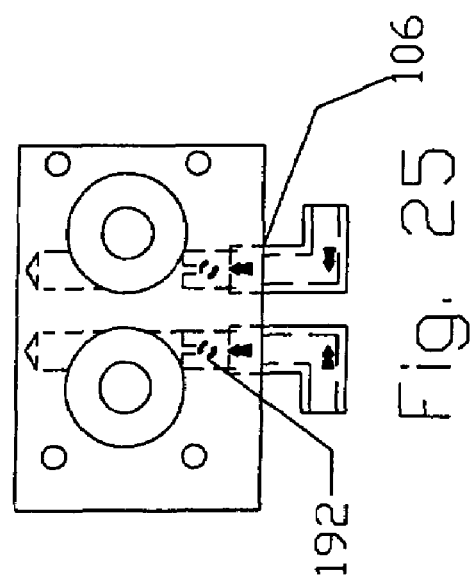
FIG. 25 is an illustration of an exemplary carburetion system.
Figure 24:
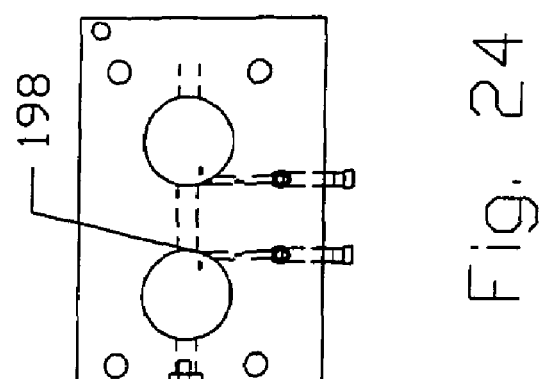
FIG. 24 is an illustration of an exemplary carburetion system.
Figure 28:
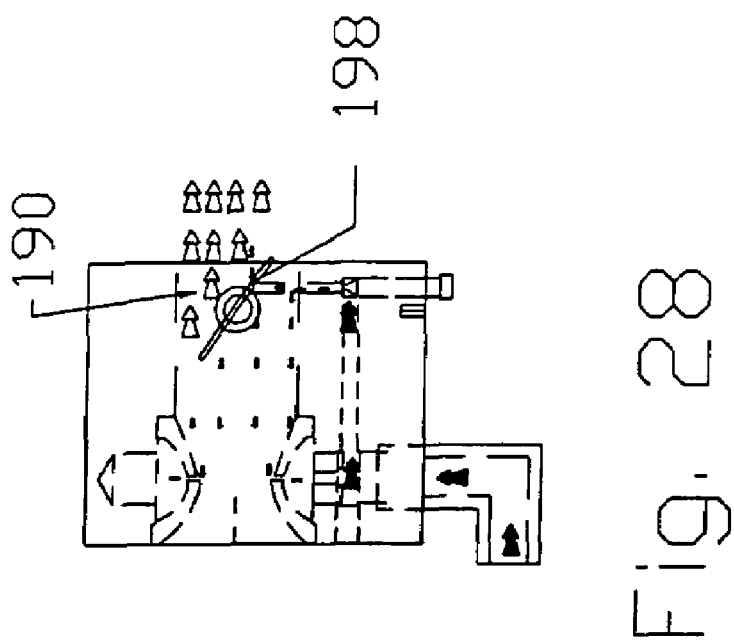
FIG. 28 is an illustration of an exemplary carburetion system.
Figure 27:
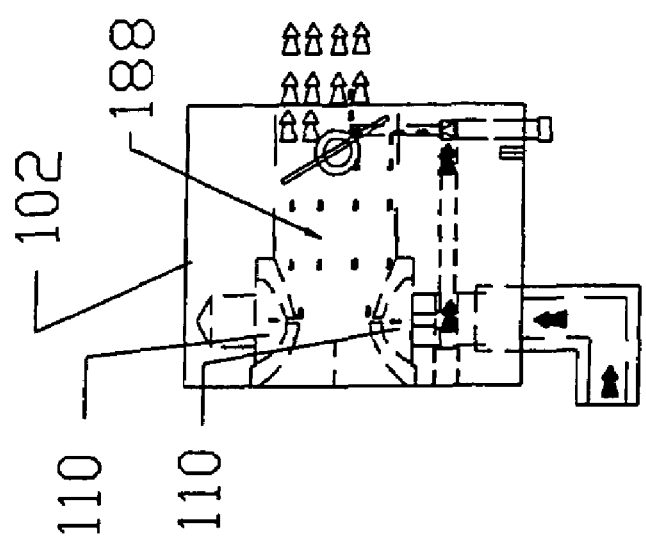
FIG. 27 is an illustration of an exemplary carburetion system.

In an embodiment illustrated in FIGS. 13-15, the carburetor 102 comprises an idle adjustment hole 126, where an engine idle adjustment device 128 is located. In many modern engines, the carburetor is placed under an engine shroud. This prevents visual access to the engine idle adjustment device. The engine idle adjustment device 128 is used to adjust the stopping position of throttle valve plate 150 contained within carburetor 102. The idle adjustment hole 126 provides a means for more easily locating the idle adjustment device 128, when the view of its location is obscured by an obstacle, such as an engine shroud 152.

Airflow through a typical carburetor body 158 is controlled by the rotation of the throttle valve plate 150 when attached to a throttle shaft 156. The amount of throttle shaft 156 rotation is determined by limits designed into one of a full open throttle lever 170 or a partial open throttle lever 172. Both levers strike the idle adjustment device 128 and full throttle stop 160 to determine rotation amount. Full open throttle lever 170 is configured to provide full throttle opening 166. Partial open throttle lever 172 is configured to provide partial throttle opening 162. The difference between the full open throttle lever 170 and the partial open throttle lever 172 is the configuration of maximum throttle strike point 164.

In an embodiment of the carburetor 102 illustrated in FIGS. 16-21, the carburetor 102 can be configured to achieve full throttle opening 166 when using one of full open throttle lever 170 and partial open throttle lever 172. In this embodiment, the full throttle stop 160 is moved so that full throttle stop 160 strikes the throttle lever at an alternative throttle strike point 154 common to both full open throttle lever 170 and partial open throttle lever 172.

In an embodiment of the carburetor 102 illustrated in FIGS. 22-28, each throttle valve chamber 168 present in carburetor 102 contains an idle circuit 184 comprising one idle fuel port 192 and an idle adjustment 194. Idle fuel port 192 is supplied fuel 130 by one of extended passage 108, venturi exterior 110, fuel supply port 106, and fuel bowl 112. Idle circuit outlet 196 of idle circuit 184 is fluidly coupled to throttle valve chamber 168. Idle circuit outlet 196 is located proximate the engine side of throttle valve plate 150. The engine side of the throttle valve plate 150 is exposed to an area of increased vacuum 190, when compared with an area of lower vacuum 186 on the opposite side of the throttle valve plate 150. This area of increased vacuum 190 is the result of the closure or the partial closure of the throttle valve plate 150. Increased area of vacuum 190 will exist to some extent until throttle valve plate 150 is fully opened and the vacuum 186 equalizes between the venturi outlet second end 124 and the throttle valve chamber 168. When the idle circuit 184 is located opposite 188 of the area of increased vacuum 190, idle circuit outlet 196 has an alternative idle circuit outlet 198 location proximate throttle shaft 156 and proximate the engine side of the throttle valve plate 150 (i.e., an area of increased vacuum 190).

While the present invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A gaseous fuel device comprising:
   a restriction in a carburetion system configured to draw a gaseous fuel into said carburetion system, mix said gaseous fuel with air and discharge a fuel air mixture for combustion, said restriction including a restriction diameter;
   an air inlet coupled within said restriction, said air inlet configured to reduce a flow area from an air inlet first end to an air inlet second end;
   a fuel air outlet coupled within said restriction, said fuel air outlet configured to increase said flow area from a fuel air outlet first end to a fuel air outlet second end, said fuel air outlet first end proximate said air inlet second end;
   a throat coupled within said restriction between said air inlet second end and said fuel air outlet first end;
   a gaseous fuel supply passage in fluid communication within said restriction and proximate said throat, wherein said gaseous fuel supply passage is located between said air inlet first end and said fuel air outlet second end from about 40 percent to about 55 percent of said length measured from said fuel air outlet second end;
   a length comprising a distance from said air inlet first end to said fuel air outlet second end;
   a ratio between said restriction diameter and said length comprising at most 1.38 to 1; and
   wherein said air inlet and said gaseous fuel supply passage are configured as one of said air inlet having a radius with said gaseous fuel supply passage formed as slots, said air inlet having a radius with said gaseous fuel supply passage formed as bores, and said air inlet having a taper with said gaseous fuel supply passage formed as slots.

2. The device of claim 1 wherein
   said restriction is configured for said gaseous fuel to flow through said gaseous fuel supply passage into said fuel air outlet proximate said throat and mix with said air flowing through said fuel air outlet from said throat.

3. The device of claim 1 wherein
   said gaseous fuel supply passage comprises one of at least one slot and at least one bore.

4. The device of claim 1 wherein said fuel air outlet includes a variable fuel air outlet diameter configured to match a throttle bore adjacent said fuel air outlet second end and a variable distance between said fuel air outlet second end and said fuel air outlet first end.

5. The device of claim 1 comprising one of a straight cut, a radius and a taper in said throat.

6. The device of claim 1 wherein said air inlet includes one of a radius and a taper from said air inlet first end to said air inlet second end.

7. The device of claim 1 wherein said fuel air outlet includes a straight cut, a tapered profile, and a radius profile along a fuel air outlet inner wall from said fuel air outlet first end to said fuel air outlet second end.

8. The device of claim 1 comprising:
   a fuel space upstream and proximate said gaseous fuel supply passage and downstream from said gaseous fuel source, said fuel space configured to contain a volume of said gaseous fuel for supply to said fuel supply passage.

9. The device of claim 1 comprising:
   a fuel air outlet first end diameter one of a diameter larger than said air inlet second end and a diameter of equal diameter to said air inlet second end in said fuel air outlet proximate said throat.

10. A fuel conversion device comprising:
    a venturi body extending from a venturi first end to a venturi second end, said venturi body including a venturi length comprising a distance from said venturi first end to said venturi second end and a restriction diameter extending radially to a venturi outer wall;
    an air inlet portion formed in said venturi body having an air inlet first end and an air inlet second end opposite said air inlet first end;
    a fuel air outlet portion formed in said venturi body having a fuel air outlet first end and a fuel air outlet second end opposite said fuel air outlet first end, said fuel air outlet first end located proximate said air inlet second end;
    a throat formed in said venturi body between said air inlet second end and said fuel air outlet first end;
    a gaseous fuel supply passage disposed through said venturi body proximate said throat, wherein said gaseous fuel supply passage couples with said fuel air outlet proximate said throat at a location from about 40 percent to about 55 percent of said venturi length measured from said venturi second end;
    a ratio between said restriction diameter and said venturi length comprising at most 1.38 to 1; and
    wherein said air inlet and said gaseous fuel supply passage are configured in one of a configuration of said air inlet having a radius with said gaseous fuel supply passage comprising a slot, said air inlet having a radius with said gaseous fuel supply passage comprising a bore and said air inlet having a taper with said gaseous fuel supply passage comprising a slot.

11. The device of claim 10 wherein said gaseous fuel supply passage is configured to fluidly couple a gaseous fuel source with said fuel air outlet portion proximate said throat.

12. The device of claim 10 wherein said gaseous fuel supply passage comprises one of at least one slot and at least one bore.

13. The device of claim 10 wherein said air inlet portion includes one of a radius and a taper formed between said air inlet first end and said air inlet second end.

14. The device of claim 10 wherein said fuel air outlet portion includes one of a back cut, a radius and a taper along said fuel air outlet inner wall.

15. The device of claim 10 comprising:
a fuel space formed proximate said gaseous fuel supply passage at said venturi outer wall, wherein said venturi outer wall includes an outer wall radius proximate said gaseous fuel supply passage and a fuel inlet, said fuel space configured to contain a volume of a gaseous fuel for supply to said gaseous fuel supply passage.

16. The device of claim 10 wherein said venturi body includes a carburetor throttle bore matching feature, said carburetor throttle bore matching feature including a configuration of said fuel air outlet portion along said fuel air outlet inner wall variable by the location of said throat relative to said fuel air outlet second end and an inner diameter of said fuel air outlet inner wall, wherein said inner diameter proximate said venturi second end matches said carburetor throttle bore.

17. The device of claim 10 wherein said fuel air outlet first end comprises a diameter larger than a diameter of said air inlet second end.

18. A method of using a fuel conversion device comprising:
drawing air into a carburetion system air inlet and reducing a flow area of said air flowing through said air inlet from an air inlet first end to an air inlet second end;
increasing said flow area from a fuel air outlet first end to a fuel air outlet second end, said fuel air outlet first end proximate a throat between said air inlet and said fuel air outlet;
drawing a gaseous fuel into said fuel air outlet through a fuel supply passage proximate said throat at a location between said air inlet first end and said fuel air outlet second end at a dimension of from about 40 percent to about 55 percent of a venturi length measured from said fuel air outlet second end, said venturi length comprising a distance from said air inlet first end to said fuel air outlet second end;
mixing said gaseous fuel with said air proximate said throat and through said fuel air outlet and forming a fuel air mixture;
discharging said fuel air mixture from said fuel air outlet second end for combustion;
forming a ratio between a restriction diameter and said venturi length, said restriction diameter comprising an outer diameter of said air inlet first end, said ratio comprising at most 1.38 to 1; and
wherein said air inlet and said fuel supply passage comprise one of a radius along said air inlet with said fuel supply passage forming a slot, a radius along said air inlet with said fuel supply passage forming a bore, and a taper along said air inlet with said fuel supply passage forming a slot.

19. The method of claim 18 comprising:
drawing said gaseous fuel from a gaseous fuel supply coupled to said carburetion system.

20. The method of claim 18 comprising:
drawing said gaseous fuel into said throat through said fuel supply passage wherein said fuel supply passage comprises one of at least one slot and at least one bore proximate said throat.

21. The method of claim 18 comprising:
containing a volume of said gaseous fuel for supply to said fuel supply passage in a fuel space upstream and proximate said fuel supply passage and downstream from a gaseous fuel source.

22. The method of claim 18 comprising:
matching an inner diameter of said fuel air outlet proximate said fuel air outlet second end with a carburetor throttle bore, said matching including varying a location of said throat relative to said fuel air outlet second end and varying said inner diameter of said fuel air outlet, wherein said inner diameter proximate said fuel air outlet second end matches said carburetor throttle bore.

* * * * *